(12) United States Patent
Courtney

(10) Patent No.: US 10,105,865 B2
(45) Date of Patent: Oct. 23, 2018

(54) CROWN MOLDING JIG DEVICE AND RELATED DEVICES

(71) Applicant: Brooks Courtney, North Port, FL (US)

(72) Inventor: Brooks Courtney, North Port, FL (US)

( * ) Notice: Subject to any disclaimer, the term of this patent is extended or adjusted under 35 U.S.C. 154(b) by 366 days.

(21) Appl. No.: 14/977,029

(22) Filed: Dec. 21, 2015

(65) Prior Publication Data
US 2016/0176066 A1 Jun. 23, 2016

Related U.S. Application Data

(60) Provisional application No. 62/095,603, filed on Dec. 22, 2014.

(51) Int. Cl.
*B27G 5/02* (2006.01)
*B23D 33/10* (2006.01)

(52) U.S. Cl.
CPC ............ *B27G 5/026* (2013.01); *B23D 33/10* (2013.01); *Y10T 29/49948* (2015.01); *Y10T 83/7593* (2015.04); *Y10T 83/8773* (2015.04)

(58) Field of Classification Search
CPC ... B27G 5/06; B27G 5/026; B27G 5/00–5/04; B27F 5/00; B27F 5/02; B27F 5/10; B27F 5/12; B27F 1/01; B27F 1/00; B27F 1/04; B27F 1/08; B27F 1/10; E04F 21/003; E04F 21/0007; E05D 11/0009; G01B 5/14; B27C 5/00; B27C 5/10; B23B 47/00; B23B 47/28–47/288; Y10T 29/49947; Y10T 29/49998; Y10T 408/50; Y10T 408/5614; Y10T 409/30896; Y10T 83/7593; B23D 33/10
See application file for complete search history.

(56) References Cited

U.S. PATENT DOCUMENTS

| | | | | |
|---|---|---|---|---|
| 4,154,435 A | * | 5/1979 | Alessio | B23D 47/04 144/286.1 |
| 4,281,827 A | * | 8/1981 | Horwath | B27G 5/02 269/189 |
| 4,295,623 A | * | 10/1981 | Schweizer | G11B 23/0236 211/170 |
| 4,842,453 A | * | 6/1989 | Raines | B23B 47/287 408/115 R |
| 4,875,399 A | | 10/1989 | Scott et al. | |
| 4,880,042 A | | 11/1989 | Schafferkotter | |
| 4,978,096 A | * | 12/1990 | Struckmann | A47B 23/043 24/18 |
| 5,484,124 A | * | 1/1996 | Billings | A47B 21/0371 248/118 |
| 5,730,434 A | * | 3/1998 | Schoene | B23D 47/04 269/249 |
| 5,819,420 A | | 10/1998 | Collins | |

(Continued)

*Primary Examiner* — Sarang Afzali

(74) *Attorney, Agent, or Firm* — Allen, Dyer, Doppelt + Gilchrist, PA

(57) ABSTRACT

A crown molding jig device may include first and second frames. Each of the first and second frames may have a vertex portion, and first and second legs extending from the vertex portion. The second legs of the first and second frames may define a recess between. The first leg of the second frame may define first and second slots. The crown molding jig device may include first and second adjustable studs carried by the first leg of the first frame, and being slidably received by the first and second slots so that the recess is adjustable in size.

19 Claims, 8 Drawing Sheets

(56) References Cited

U.S. PATENT DOCUMENTS

| | | | |
|---|---|---|---|
| 5,893,402 A | 4/1999 | Darling | |
| 6,152,009 A | 11/2000 | Jorgensen et al. | |
| 6,422,117 B1 | 7/2002 | Burch | |
| 6,481,320 B1 | 11/2002 | McGrory et al. | |
| 6,668,695 B2 | 12/2003 | Poole et al. | |
| 6,676,142 B2 * | 1/2004 | Allman | B60G 3/265 280/86.751 |
| 6,782,782 B1 | 8/2004 | Shangle et al. | |
| 6,938,528 B2 | 9/2005 | Lewis | |
| 7,210,676 B1 | 5/2007 | Blau | |
| 7,360,476 B2 * | 4/2008 | Berthiaume | B23D 47/04 83/465 |
| 7,487,940 B2 * | 2/2009 | Saez | A47B 23/043 248/176.1 |
| 7,726,224 B1 * | 6/2010 | Panko | B23D 47/025 269/303 |
| 7,854,072 B2 * | 12/2010 | Stark | B25B 1/10 33/537 |
| 7,930,961 B2 * | 4/2011 | Kozina | B23D 47/04 33/569 |
| D640,112 S | 6/2011 | Smith | |
| 8,109,527 B2 * | 2/2012 | Bustle | A61G 12/001 248/118.3 |
| 8,157,228 B2 * | 4/2012 | Smith | E04F 21/1855 248/222.14 |
| 8,646,368 B1 | 2/2014 | Clark | |
| 2001/0011564 A1 | 8/2001 | Darling | |
| 2007/0137450 A1 * | 6/2007 | Nagyszalancy | B23D 45/044 83/13 |
| 2008/0250905 A1 * | 10/2008 | Khan | B27B 27/08 83/23 |
| 2010/0205900 A1 | 8/2010 | Stevick | |
| 2011/0277331 A1 | 11/2011 | Glomb, Sr. | |

* cited by examiner

CROWN MOLDING JIG DEVICE AND RELATED DEVICES

RELATED APPLICATION

This application is based upon prior filed copending Application No. 62/095,603 filed Dec. 22, 2014, the entire subject matter of which is incorporated herein by reference in its entirety.

TECHNICAL FIELD

The present disclosure relates to the field of jig devices, and, more particularly, to a crown molding jig device and related methods.

BACKGROUND

In construction, crown molding comprises moldings that are designed to gracefully flare out to a finished top edge. Crown molding is generally used for capping walls, pilasters, and cabinets, and is used extensively in the creation of interior and exterior cornice assemblies and door and window hoods.

In most applications, crown molding is manufactured in long unfinished strips. The material of the crown molding strip is typically a variety of wood, such as pine. Before installation, the crown molding must be cut for placement; in particular, the length of the strip and the angle of the end must be matched to an installation. Also, for corner installations, a companion crown molding strip must be accurately mated with the end of the first piece. For example, for a 90 degree angle corner, each crown molding piece must be terminated with a 45 degree angled edge. Otherwise, the installation may leave an exposed unfinished edge. Of course, to aid in making accurate cuts, a crown molding jig device may be used.

SUMMARY

Generally, a crown molding jig device may comprise first and second frames. Each of the first and second frames may have a vertex portion, and first and second legs extending from the vertex portion. The second legs of the first and second frames may define a recess therebetween. The first leg of the second frame may define first and second slots. The crown molding jig device may comprise first and second adjustable studs carried by the first leg of the first frame, and being slidably received by the first and second slots so that the recess is adjustable in size. Advantageously, the crown molding jig device may be readily sized to a large variety of crown molding pieces.

In particular, each of the first and second frames may have first and second sides with multi-angle surfaces. Each of the first and second sides may comprise a first edge, a second edge at an acute angle to the first edge, and a third edge at an acute angle to the first edge.

In some embodiments, the crown molding jig device may include at least one spacer block adjacent the first leg of the first frame. The first and second frames may be positioned in a nested arrangement. The second frame may have a width less than a width of the first frame, and the second frame may have a length less than a length of the first frame.

The first and second adjustable studs may each comprise a threaded stud. The crown molding jig device may include first and second threaded nuts being respectively threadingly received by the first and second threaded studs. The first and second legs of the first frame may define an angle in a range of 25-75 degrees therebetween, and the first and second legs of the second frame may define an angle in a range of 25-75 degrees therebetween. For example, the first and second frames may be V-shaped.

Another aspect is directed to a method for making a crown molding jig device. The method may include forming first and second frames, each of the first and second frames having a vertex portion, and first and second legs extending from the vertex portion. The second legs of the first and second frames may define a recess therebetween. The first leg of the second frame may define first and second slots. The method may further comprise coupling first and second adjustable studs to be carried by the first leg of the first frame, and to be slidably received by the first and second slots so that the recess is adjustable in size.

Yet another aspect is directed to a method for using a crown molding jig device. The method may include positioning first and second frames, each of the first and second frames having a vertex portion, and first and second legs extending from the vertex portion. The second legs of the first and second frames may define a recess therebetween. The first leg of the second frame may define first and second slots. First and second adjustable studs may be carried by the first leg of the first frame, and be slidably received by the first and second slots. The method may comprise positioning a crown molding piece within the recess, and slidably adjusting the second frame with respect to the first frame so that the recess matches the crown molding piece.

DETAILED DESCRIPTION

The present disclosure will now be described more fully hereinafter with reference to the accompanying drawings, in which several embodiments of the disclosure are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Referring to FIGS. 1-8, a crown molding jig device 10 according to the present disclosure is now described. The crown molding jig device 10 illustratively includes first and second frames 11, 12. Each of the first and second frames 11, 12 has a cross-sectional (i.e. seen from a side, FIGS. 2-4) A-shape/V-shape. In particular, each of the first and second frames 11, 12 comprises a vertex portion 27, 21, and first and seconds legs extending outwardly from the vertex portion. The first and second legs extend outwardly at an illustrative angle of 45 degrees, but the angle may comprise any value in the range of 25-75 degrees. The first and second legs of the first frame 11 each have first and second sides with multi-angle surfaces/edges.

Figure 2:
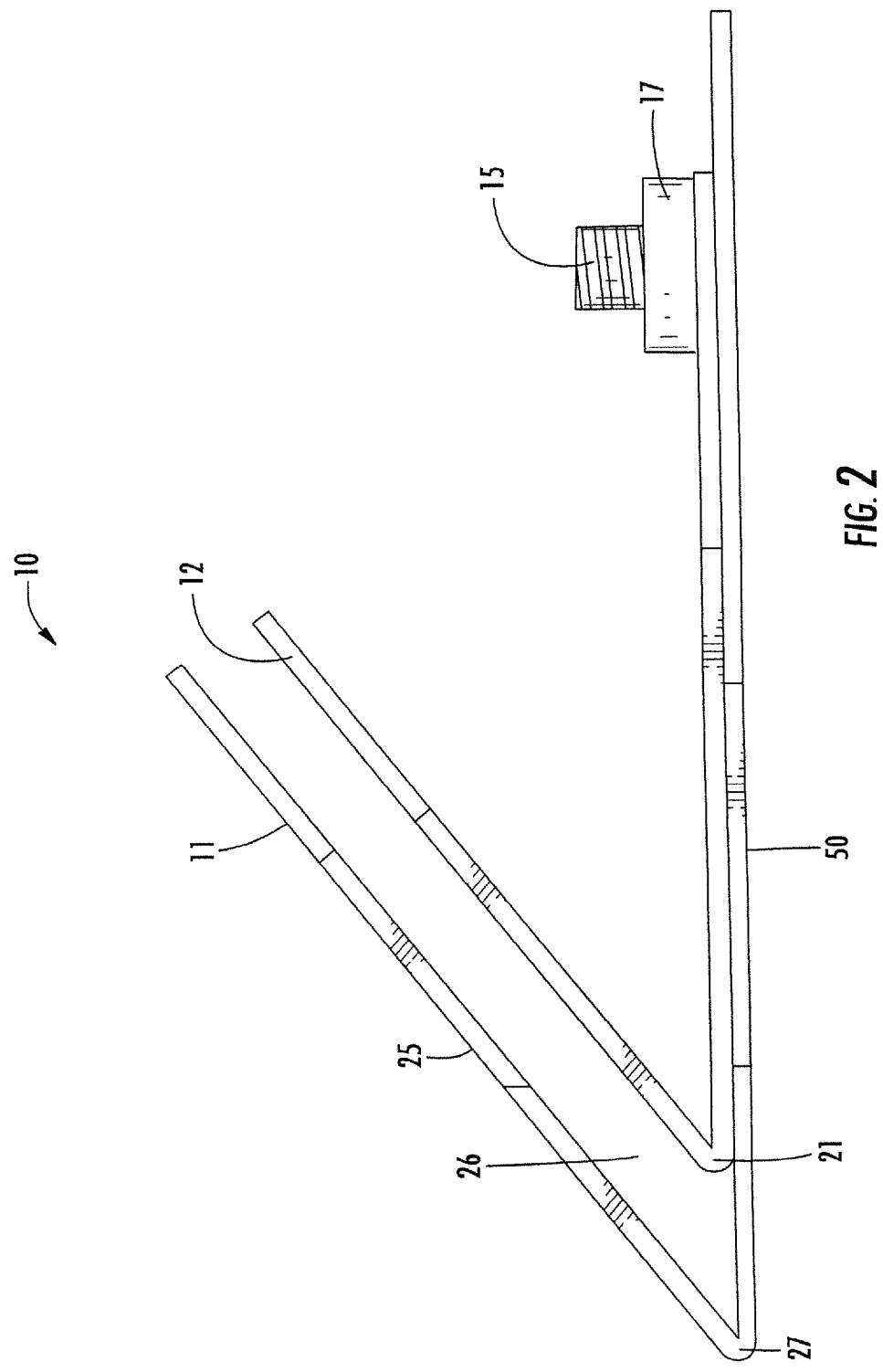
FIG. 2 is a side elevation view of the crown molding jig device from FIG. 1.
Figure 5:
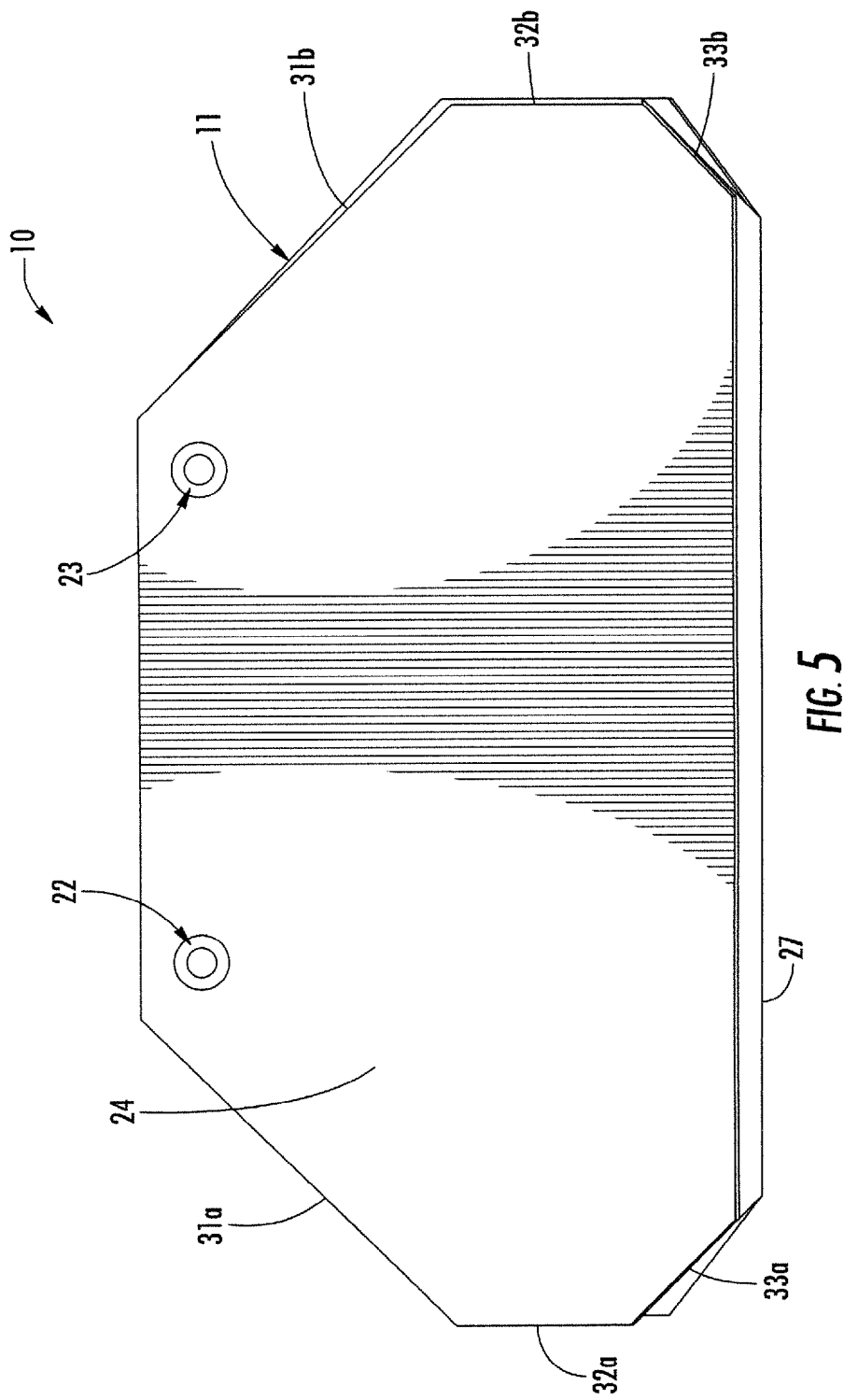
FIG. 5 is a bottom plan view of the crown molding jig from FIG. 1 with both of the first and second spacer blocks.
Figure 6:
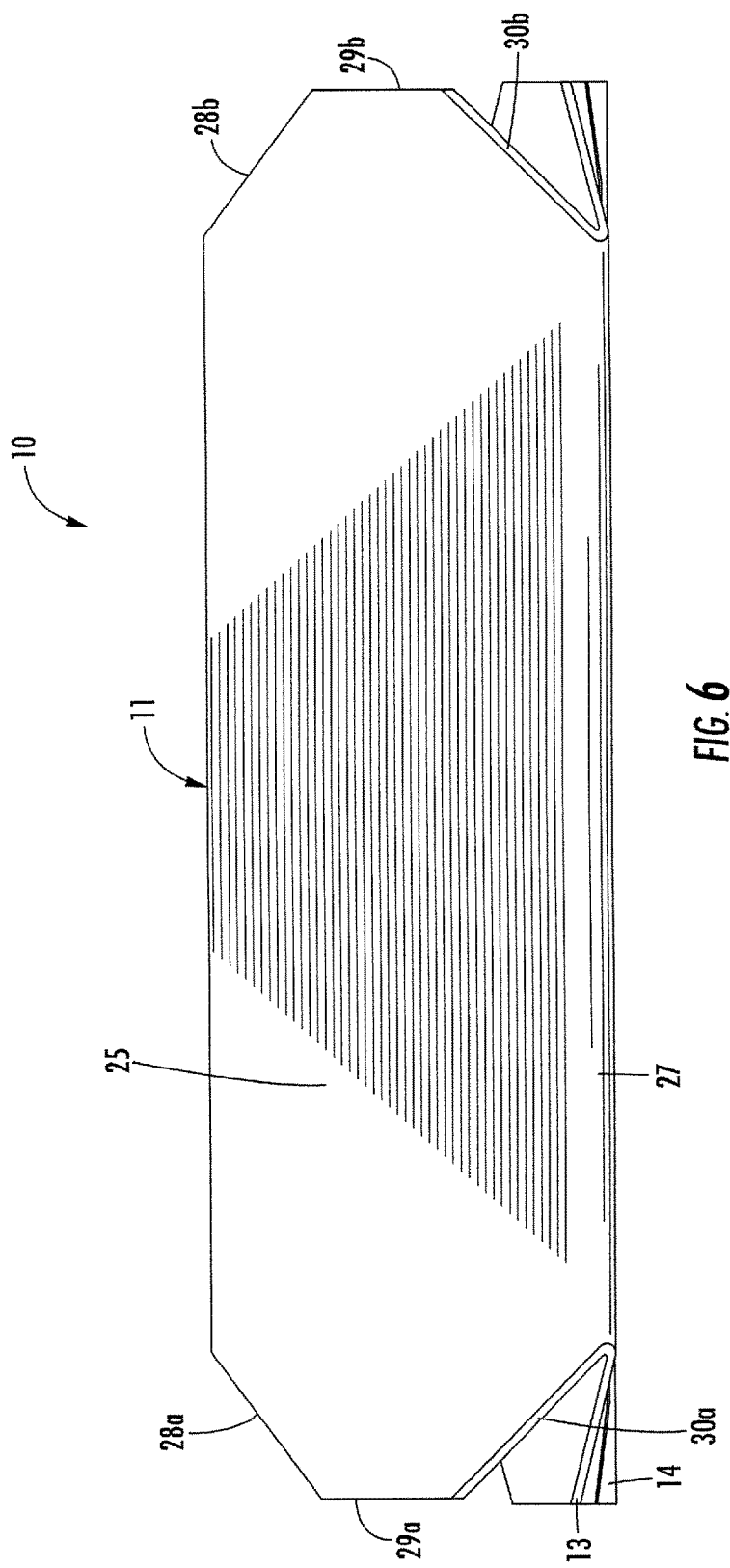
FIG. 6 is a back elevation view of the crown molding jig device from FIG. 1 with both of the first and second spacer blocks.
Figure 7:
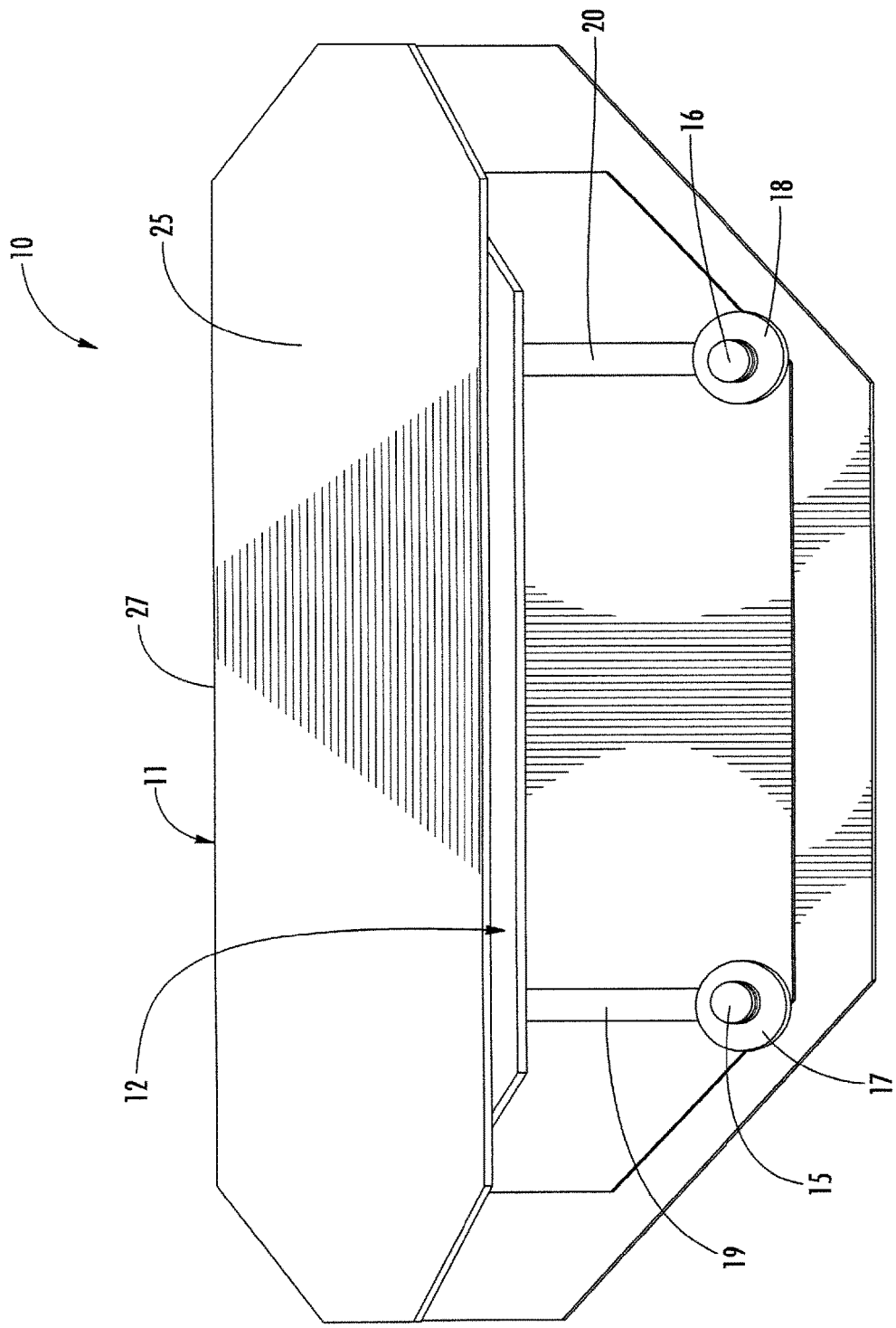
FIG. 7 is a top plan view of the crown molding jig device from FIG. 1.

Also, as perhaps best seen in FIGS. 2, 5 and 6, the first frame 11 illustratively includes a bottom surface 50 (FIG. 2), the bottom surface defining first and second openings (not shown), and a top surface 25 (FIG. 6). In particular, each multi-surface edges of the first frame 11 comprise a first edge 29a-29b, 32a-32b, and second 28a-28b, 31a-31b and third 30a-30b, 33a-33b edges being an angle (illustratively 45 degrees, but the angle may comprise any value in the range of 25-75 degrees) to the first edge.

The crown molding jig device 10 illustratively includes first and second threaded studs 15, 16 carried by a distal portion of the first leg of the first frame 11, and through the first and second openings of the first frame. In some embodiments, the first and second threaded studs 15, 16 may be welded to the first frame 11, and there may be no openings. In other embodiments, the first and second threaded studs 15, 16 may comprise other adjustable mechanisms, such as a spring loaded mechanism. Also, the first leg of the second frame 12 defines first and second longitudinal slots 19, 20, which receive the first and second threaded studs 15, 16. The crown molding jig device 10 illustratively includes first and second nuts 17, 18 threadingly received by the first and second threaded studs 15, 16, which fix the relation of the second frame 12 to the first frame 11. In some embodiments, the first and second nuts 17, 18 may comprise a hand knob nut, i.e. a threaded screw nut with a knob attachment permitting hand rotation.

The first and second vertex portions 27, 21 define a recess 26 therebetween for receiving the crown molding piece. Using the adjustable nature of the first and second nuts 17, 18, a size of the recess 26 can be readily adjusted to receive and clamp varying sizes of the crown molding piece by sliding the second frame 12 over the first and second threaded studs 15, 16 and along the longitudinal slots 19, 20 (as will be appreciated, this mechanical fixation must be of sufficient rigidity and strength to permit safe and accurate cutting of the crown molding piece with a mechanized saw). The first and second nuts 17, 18 may comprise an inner radial surface that is threaded. Helpfully, the crown molding jig device 10 may be able to accommodate large crown molding pieces readily, unlike crown molding jig devices of the prior art.

As shown in FIGS. 1, 3-5, and 8, the crown molding jig device 10 illustratively includes first and second spacer blocks 13, 14 below and adjacent to the first frame 11. The first and second spacer blocks 13, 14 each has a wedge shape with an outer peripheral edge spanning approximately (i.e. within +/−15%) α=7 degrees. Although the outer peripheral edges of the first and second spacer blocks 13, 14 illustratively span 7 degrees, other embodiments may include other angle values. For example, larger or smaller angles can be used to provide more precision in controlling the angle.

In some embodiments, the first and second spacer blocks 13, 14 are coupled to the first leg of the first frame 11, for example, via removable fasteners, such as a threaded screw or an interlocking mechanism. In addition, the second spacer block 14 may comprise a removable fastener (e.g. threaded screw or an interlocking mechanism) coupling the second spacer block to the first spacer block 13. Also, as perhaps best seen in FIG. 5, the second spacer block 14 illustratively includes a bottom surface 24, the bottom surface defining first and second openings 22, 23. The first and second openings 22, 23 receive the removable fasteners for fixing the second spacer block 14 onto the first spacer block 13.

In other embodiments, the first and second spacer blocks 13, 14 may be omitted or replaced with another mechanism for adjustably setting an angle of the bottom surface 24. For example, this mechanism may comprise a spring loaded platform.

The crown molding jig device 10 may comprise at least one of the following materials: metal, steel, aluminum, plastic, and polymer. Indeed, any material may be used that has the threshold hardness to safely hold the crown molding piece in the recess 26 during a cutting operation.

Figure 1:
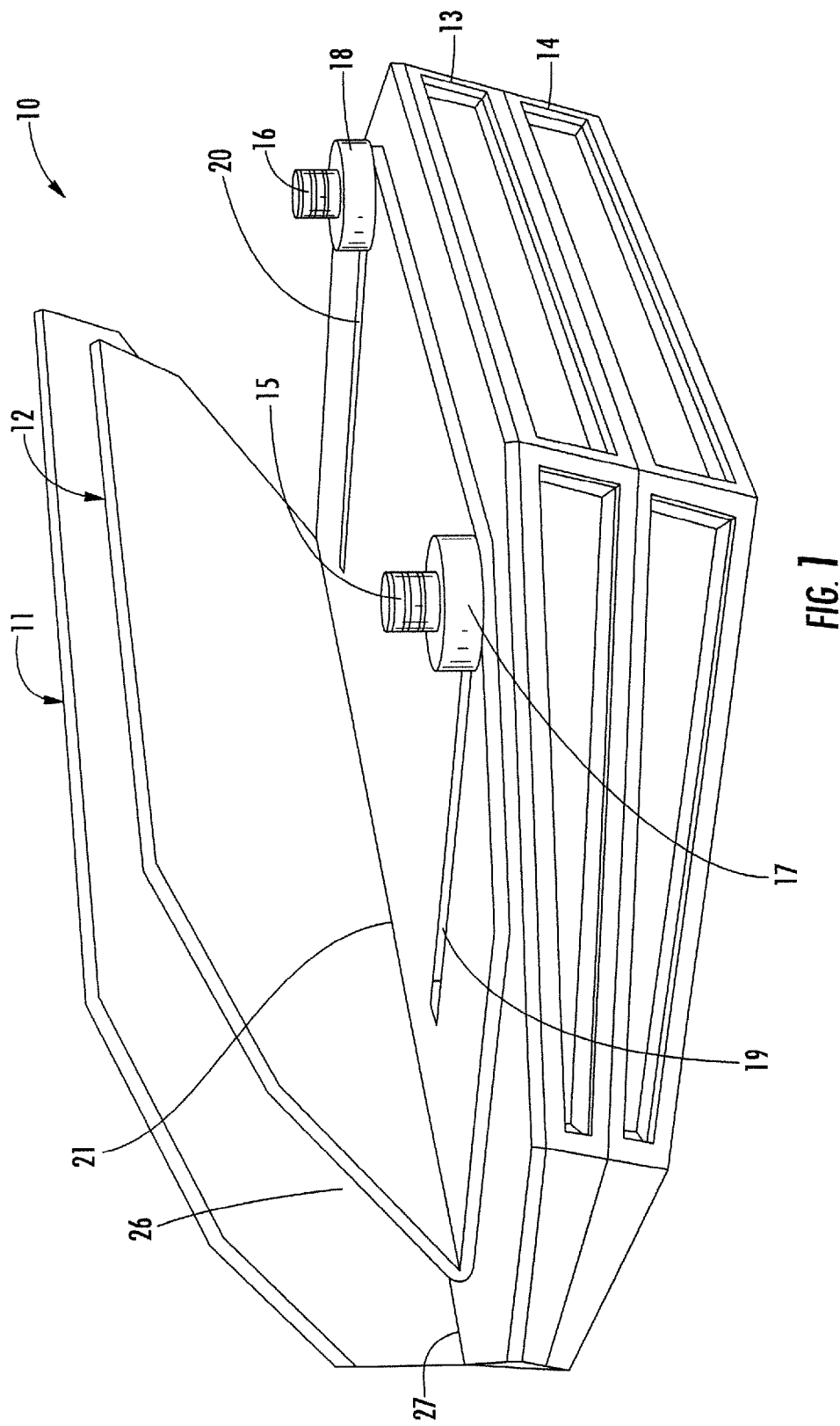
FIG. 1 is a perspective view of a crown molding jig device with first and second spacer blocks, according to the present disclosure.
Figure 3:
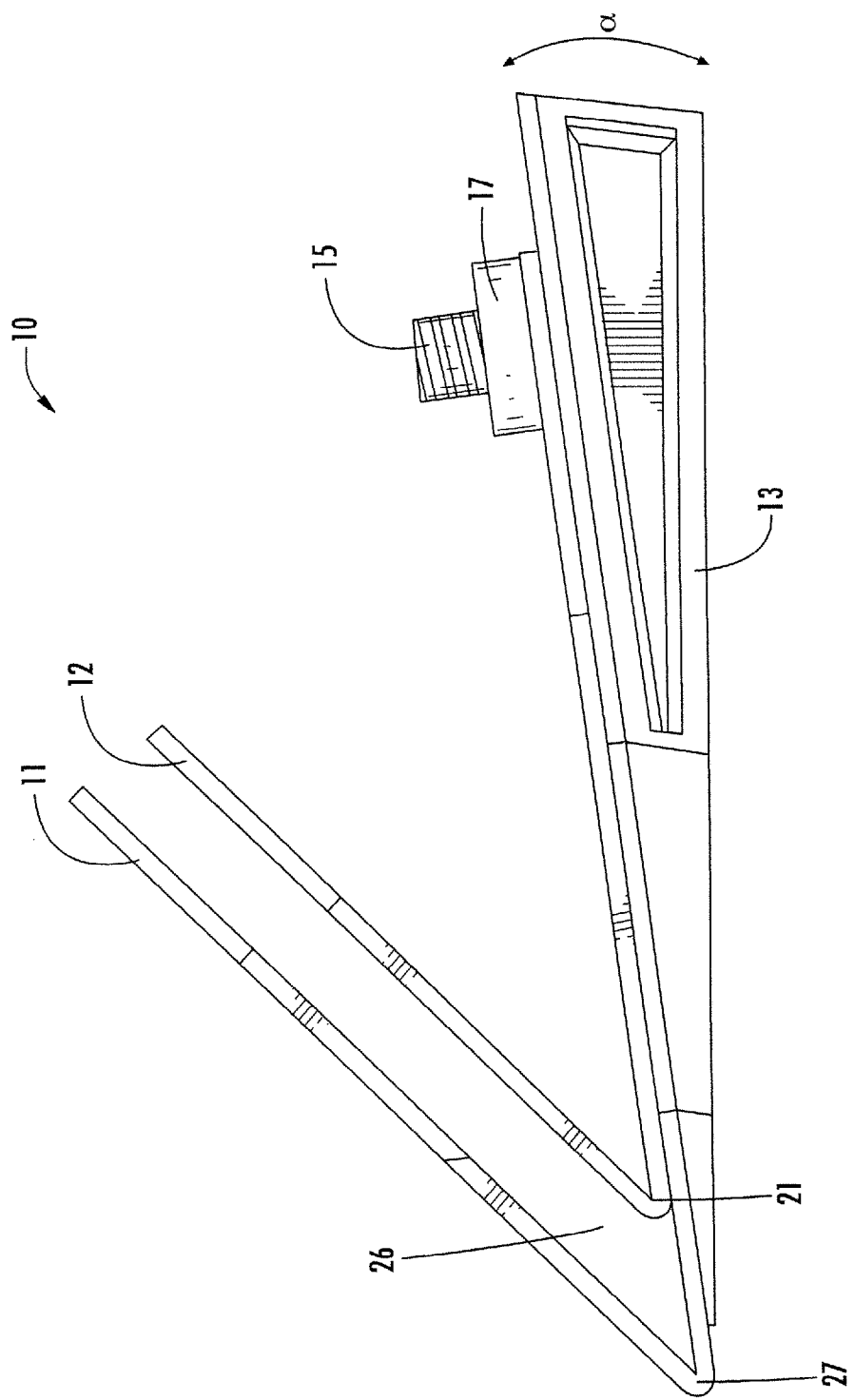
FIGS. 3 and 4 are side elevation views of the crown molding jig device from FIG. 1, respectively, with only the first spacer block, and with both of the first and second spacer blocks.
Figure 4:
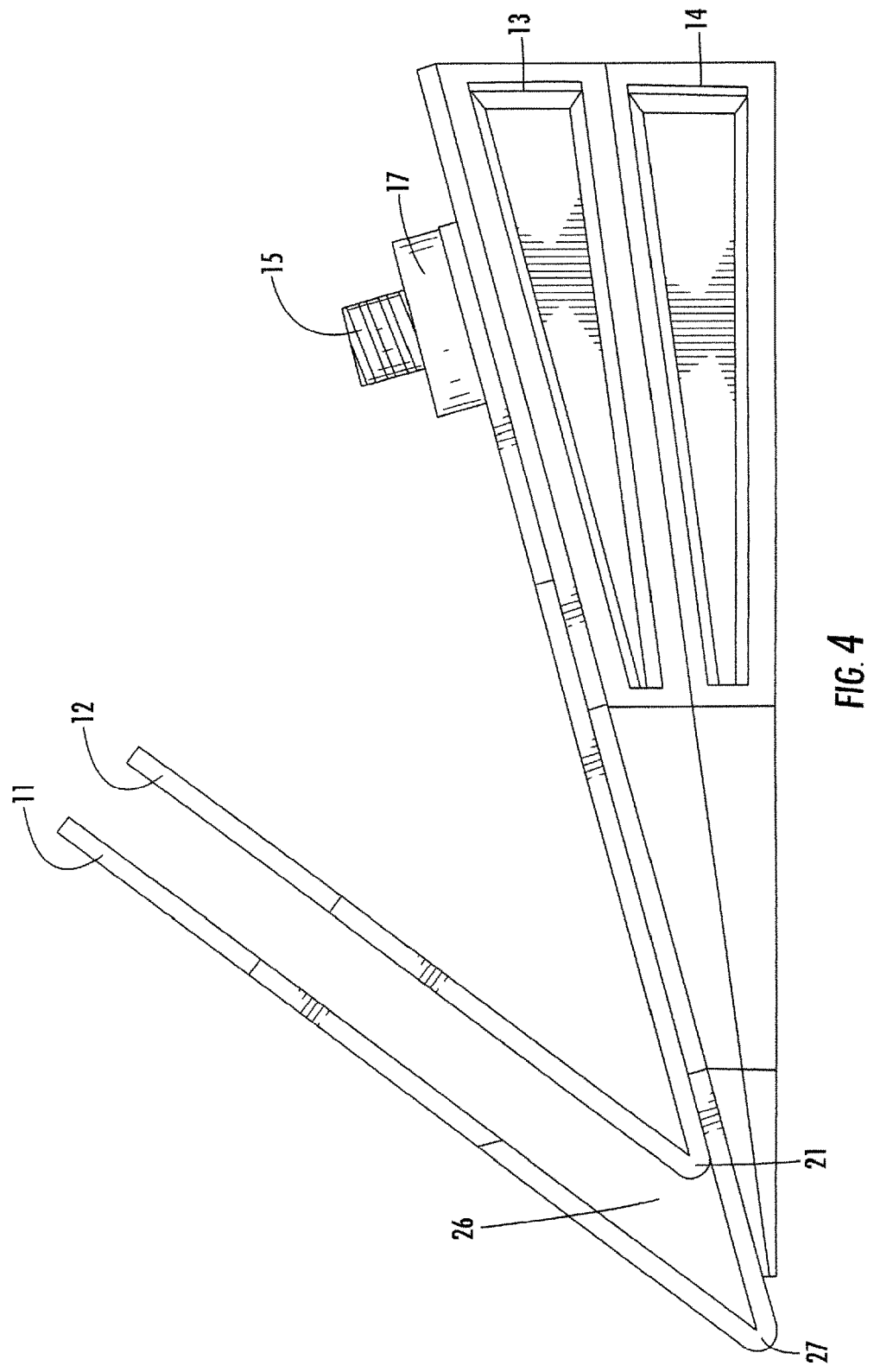
Figure 8:
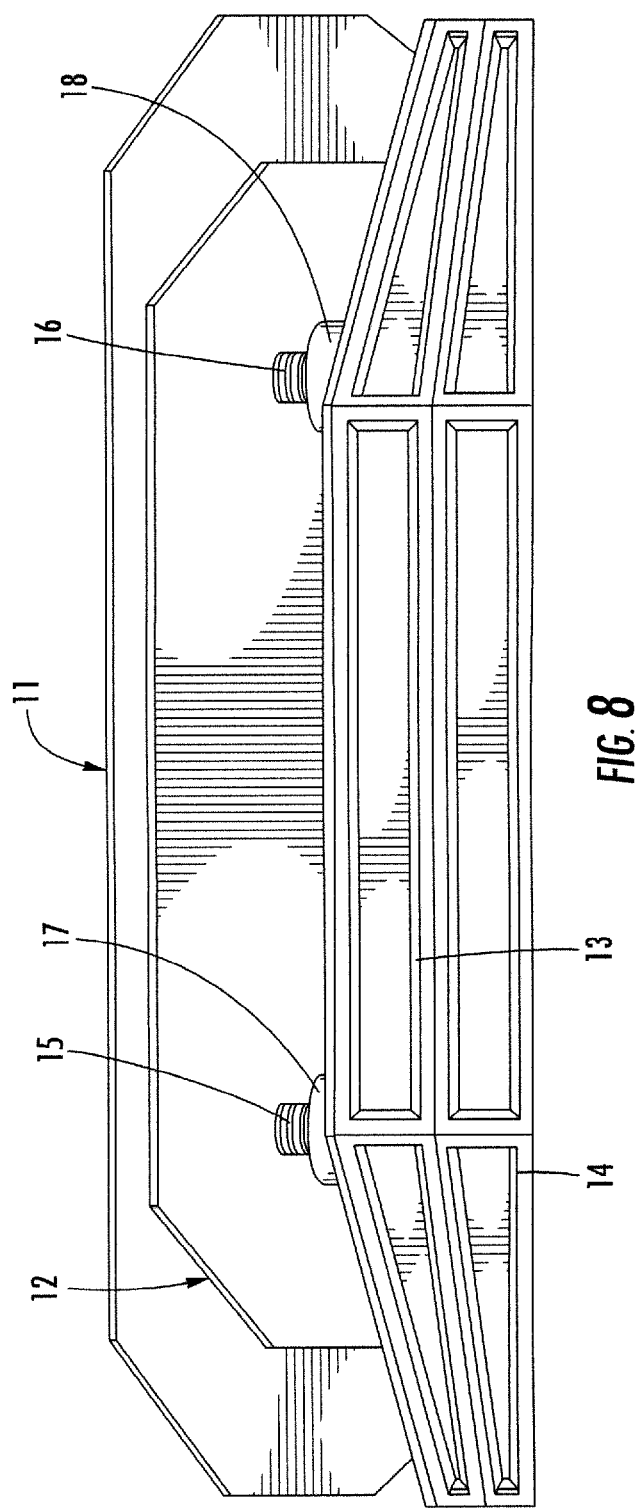
FIG. 8 is a front elevation view of the crown molding jig device from FIG. 1 with both of the first and second spacer blocks.

In typical use, the first and second frames 11, 12 are spaced apart to define the recess 26 at its maximum size, and the crown molding piece is placed in the recess 26. The second frame 12 is adjustably positioned to abut and clamp the crown molding piece in the recess 26. The first and second nuts 17, 18 are then tightened to lock the second frame 12 and the crown molding piece in place. Subsequently, the first and second spacer blocks 13, 14 are used to adjustably change the angle the crown molding piece retained in the recess 26. The first and second spacer blocks 13, 14 can be used individually, such as depicted in FIG. 3, or in combination, such as depicted in FIGS. 1 and 8. Indeed, in some applications, the first and second spacer blocks 13, 14 may not be used at all. In particular, when the crown molding jig device 10 is being used, the user will select cutting angle based upon the desired installation and will use the first and second spacer blocks 13, 14 to set the desired cutting angle. Once the desired cutting angle is set, the user may use a typical saw device to cut the crown molding piece.

Also, as noted above, the second frame 12 will be adjusted to firmly retain (i.e. clamp down on) the crown molding piece within the recess 26. Advantageously, the crown molding jig device 10 may readily be used with thick crown molding strips. Furthermore, the multi-surface edges of the first frame 11 permit the user to make the prescribed cuts at multiple angles, thereby reducing assembly time and reducing the risk of the saw device damaging the crown molding jig device 10.

Another aspect is directed to a method for making the crown molding jig device 10. The method comprises forming first and second frames 11, 12, the second frame comprising first and second longitudinal slots 19, 20. The method may comprise coupling together the first and second frames 11, 12 with first and second threaded studs 15, 16 extending through the longitudinal slots 19, 20, and first and second nuts 17, 18.

Another aspect is directed to a method for using a crown molding jig device 10 to cut a crown molding piece. The method making positioning first and second frames 11, 12, the second frame comprising first and second longitudinal slots 19, 20. The positioning may comprise coupling together the first and second frames 11, 12 with first and second threaded studs 15, 16 extending through the longitudinal slots 19, 20, and first and second nuts 17, 18. The positioning may comprise fitting a crown molding piece in a recess 26 defined between the first and second frames 11, 12, and/or using first and second spacer blocks 13, 14 adjacent the first frame to set a desired cutting angle.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of this disclosure.

That which is claimed is:

1. A crown molding jig device comprising:
   first and second V-shaped frames, each of said first and second V-shaped frames having
   a vertex portion, and
   first and second legs extending from said vertex portion;
   said vertex portions of said first and second V-shaped frames being in a nested arrangement, said second legs of said first and second V-shaped frames being parallel;
   said first legs of said first and second V-shaped frames being in a stacked arrangement;
   said second legs of said first and second V-shaped frames defining a recess therebetween;
   said first leg of said second V-shaped frame defining first and second slots;
   first and second adjustable studs carried by said first leg of said first V-shaped frame, and being slidably received by the first and second slots so that the recess is adjustable in size; and
   first and second fastening nuts being respectively received by said first and second adjustable studs.

2. The crown molding jig device of claim 1 wherein each of said first and second V-shaped frames has first and second sides with multi-angle surfaces.

3. The crown molding jig device of claim 2 wherein each of said first and second sides comprises a first edge, a second edge at an acute angle to said first edge, and a third edge at an acute angle to said first edge.

4. The crown molding jig device of claim 1 further comprising at least one spacer block adjacent said first leg of said first V-shaped frame.

5. The crown molding jig device of claim 1 wherein said second V-shaped frame has a width less than a width of said first V-shaped frame; and wherein said, second V-shaped frame has a length less than a length of said first V-shaped frame.

6. The crown molding jig device of claim 1 wherein said first and second adjustable studs each comprises a threaded stud; and wherein said first and second fastening nuts comprise first and second threaded nuts being respectively threadingly received by said first and second threaded studs.

7. The crown molding jig device of claim 1 wherein said first and second legs of said first V-shaped frame define an angle in a range of 25-75 degrees therebetween; and wherein said first and second legs of said second V-shaped frame define an angle in a range of 25-75 degrees therebetween.

8. A crown molding jig device comprising:
   first and second V-shaped frames, each of said first and second V-shaped frames having
   a vertex portion,
   first and second legs extending from said vertex portion, and
   first and second sides with multi-angle surfaces between and extending from said vertex portion;
   said vertex portions of said first and second V-shaped frames being in a nested arrangement, said second legs of said first and second V-shaped frames being parallel;
   said first legs of said first and second V-shaped frames being in a stacked arrangement;
   said second legs of said first and second V-shaped frames defining a recess therebetween;
   said first leg of said second V-shaped frame defining first and second slots;
   first and second adjustable studs carried by said first leg of said first V-shaped frame, and being slidably received by the first and second slots so that the recess is adjustable in size;
   first and second fastening nuts being respectively received by said first and second adjustable studs; and
   at least one spacer block adjacent said first leg of said first V-shaped frame.

9. The crown molding jig device of claim 8 wherein each of said first and second sides comprises a first edge, a second edge at an acute angle to said first edge, and a third edge at an acute angle to said first edge.

10. The crown molding jig device of claim 8 wherein said second V-shaped frame has a width less than a width of said first V-shaped frame; and wherein said second V-shaped frame has a length less than a length of said first V-shaped frame.

11. The crown molding jig device of claim 8 wherein said first and second adjustable studs each comprises a threaded stud; and wherein said first and second fastening nuts comprise first and second threaded nuts being respectively threadingly received by said first and second threaded studs.

12. The crown molding jig device of claim 8 wherein said first and second legs of said first V-shaped frame define an angle in a range of 25-75 degrees therebetween; and wherein said first and second legs of said second V-shaped frame define an angle in a range of 25-75 degrees therebetween.

13. A crown molding cutting device comprising:
   a crown molding jig device comprising
   first and second V-shaped frames, each of said first and second V-shaped frames having
   a vertex portion, and
   first and second legs extending from said vertex portion,
   said vertex portions of said first and second V-shaped frames being in a nested arrangement, said second legs of said first and second V-shaped frames being parallel,
   said first legs of said first and second V-shaped frames being in a stacked arrangement,
   said second legs of said first and second V-shaped frames defining a recess therebetween for receiving a crown molding piece,
   said first leg of said second V-shaped frame defining first and second slots,
   first and second adjustable studs carried by said first leg of said first V-shaped frame, and being slidably received by the first and second slots so that the recess is adjustable in size, and
   first and second fastening nuts being respectively received by said first and second adjustable studs; and
   a saw device configured to cut the crown molding piece in the recess.

14. The crown molding cutting device of claim 13 wherein each of said first and second V-shaped frames has first and second sides with multi-angle surfaces.

15. The crown molding cutting device of claim 14 wherein each of said first and second sides comprises a first edge, a second edge at an acute angle to said first edge, and a third edge at an acute angle to said first edge.

16. The crown molding cutting device of claim 13 further comprising at least one spacer block adjacent said first leg of said first V-shaped frame.

17. The crown molding cutting device of claim 13 wherein said second V-shaped frame has a width less than a width of said first V-shaped frame; and wherein said second V-shaped frame has a length less than a length of said first V-shaped frame.

18. The crown molding cutting device of claim 13 wherein said first and second adjustable studs each comprises a threaded stud; and wherein said first and second fastening nuts comprise first and second threaded nuts being respectively threadingly received by said first and second threaded studs.

19. The crown molding cutting device of claim 13 wherein said first and second legs of said first V-shaped frame define an angle in a range of 25-75 degrees therebetween; and wherein said first and second legs of said second V-shaped frame define an angle in a range of 25-75 degrees therebetween.

* * * * *